UNITED STATES PATENT OFFICE.

ALBRECHT SCHMIDT, OF HÖCHST-ON-THE-MAIN, AND GEORG KRÄNZLEIN, OF SINDLINGEN, NEAR HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

HALOGENIZED CONDENSATION PRODUCT OF THE ANTHRACENE SERIES AND PROCESS OF MAKING SAME.

1,046,498.  Specification of Letters Patent. Patented Dec. 10, 1912.

No Drawing.  Application filed April 10, 1912. Serial No. 689,859.

*To all whom it may concern:*

Be it known that we, ALBRECHT SCHMIDT, Ph. D., chemist, and GEORG KRÄNZLEIN, Ph. D., chemist, citizens of the Empire of Germany, residing at Höchst-on-the-Main, Germany, and Sindlingen, near Höchst-on-the-Main, Germany, have invented certain new and useful Improvements in Halogenized Condensation Products of the Anthracene Series and Processes of Making Same, of which the following is a specification.

We have found that the dyestuffs obtained by condensation of anthranols (under which term we comprise anthranol itself and its substitution products) with quinones (under which term we comprise quinone itself and its derivatives and analogues) can be transformed into halogenized products by the action of halogenizing agents namely halogens or agents capable of eliminating halogen. The new products dye mostly tints of a greener hue than their parent products.

The following examples illustrate our invention:

Example I: 14.9 kg. of the blue vat dyestuff, produced from anthranol and quinone, for instance by heating to boiling in nitrobenzene with or without the addition of an oxidizing agent, are mixed with 8 kg. of bromin in 120 kg. of nitrobenzene while stirring. The mixture which immediately on the addition of the bromin turns brown is gradually heated to boiling while stirring, which causes an elimination of hydrobromic acid while the solution turns bluish-green. After boiling for a short time, the resulting melt is cooled, diluted with alcohol, filtered off, washed with alcohol and dried. The dyestuff thus obtained forms a greenish-black powder, insoluble in diluted acids and alkalis, dissolving in concentrated sulfuric acid with a brownish-red color and in alkaline hydrosulfite solution with a violet color, and dyeing cotton from this solution green tints. The amount of bromin found by analysis showed: Br=28.2%; calculated for the monobromin derivative Br=21.2%. However as the dyestuff was treated only with the quantity of bromin necessary for the introduction of one atom of it, it must be assumed that the hydrobromic acid formed caused the higher percentage of bromin, which conclusion is in accordance with the benzoquinone character of the dyestuff.

In the foregoing example, the quantity of bromin can be increased, whereby products are obtained which are substantially greener. In the place of bromin, there may be used for instance sulfuryl-chlorid or chlorin or the like, while in the place of the nitrobenzene other suspending or dissolving agents (comprised under the term "diluents") may be used; furthermore, the bromination can be effected by liquid bromin.

Example II: 15 kg. of the product obtained by condensing anthranol with quinone and which gives blue tints, are mixed in 150 kg. of dry nitrobenzene with 15 kg. of sulfuryl-chlorid, this mixture is stirred for about one hour without heating and then carefully heated until it boils gently. As soon as the evolution of hydrochloric acid ceases, the mass is allowed to cool, whereupon it is filtered off, washed with alcohol and dried. In this way the dyestuff is obtained in the form of blackish crystals with a greenish blue. Its solution in concentrated sulfuric acid is violet-brown, the color of the vat is bluish-green dyeing cotton fast green tints.

Example III: If in the foregoing example 1,200 kg. of carbon tetrachlorid are substituted for the nitrobenzene and if the mass is heated on the reflux apparatus until the evolution of hydrobromic acid ceases, the bromination product isolated as above indicated yields a blue dyestuff which as regards its tinctorial properties, is closely related to the parent product. Its solution in concentrated sulfuric acid is brownish-red, the color of the vat violet. The amount of bromin found by analysis showed: Br= 20.42%; calculated for the monobrom-derivative Br=21.2%.

Having now described our invention, what we claim is:

1. The process of manufacturing halogenized products of the condensation products from an anthranol and a quinone of the general formula: $ArO_2.An$, wherein "$ArO_2$" stands for a quinone residue, and "An" for an anthranol residue, which process consists in treating the said condensation products with halogenizing agents.

2. The process of manufacturing halogenized products of the condensation products from an anthranol and a quinone of the general formula: $ArO_2An$ wherein "$ArO_2$" stands for a quinone residue and "An" for an anthranol residue, which process consists in treating the said condensation products with bromin.

3. As new articles of manufacture, the halogenized condensation products from an anthranol and a quinone, being dark green to greenish-black powders, insoluble in diluted acids and alkalis, soluble in concentrated sulfuric acid with a brownish-red to violet-brown color, yielding when treated with an alkaline hydrosulfite solution violet to green vats dyeing cotton greenish tints.

4. As a new article of manufacture, the brominated condensation product from anthranol and quinone, being insoluble in diluted acids and alkalis, dissolving in concentrated sulfuric acid to a brownish-red solution and yielding in an alkaline hydrosulfite solution a violet vat dyeing cotton green tints of excellent fastness.

In testimony whereof, we affix our signatures in presence of two witnesses.

ALBRECHT SCHMIDT.
GEORG KRÄNZLEIN.

Witnesses:
  JEAN GRUND,
  CARL GRUND.